Jan. 9, 1945.  S. GABRIELSON  2,366,721
GYRO CAGING DEVICE
Filed Dec. 27, 1943  2 Sheets-Sheet 1

Inventor:
Samuel Gabrielson,
by Harry E. Dunham
His Attorney.

Jan. 9, 1945.  S. GABRIELSON  2,366,721
GYRO CAGING DEVICE
Filed Dec. 27, 1943  2 Sheets-Sheet 2
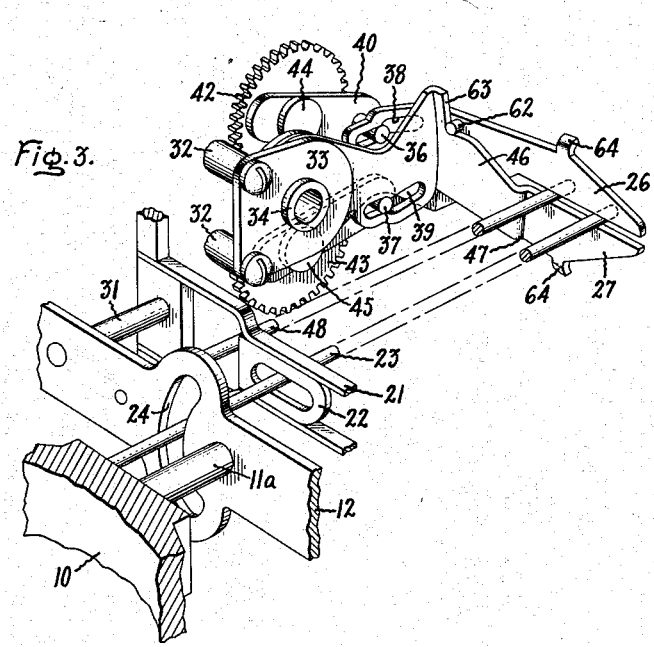
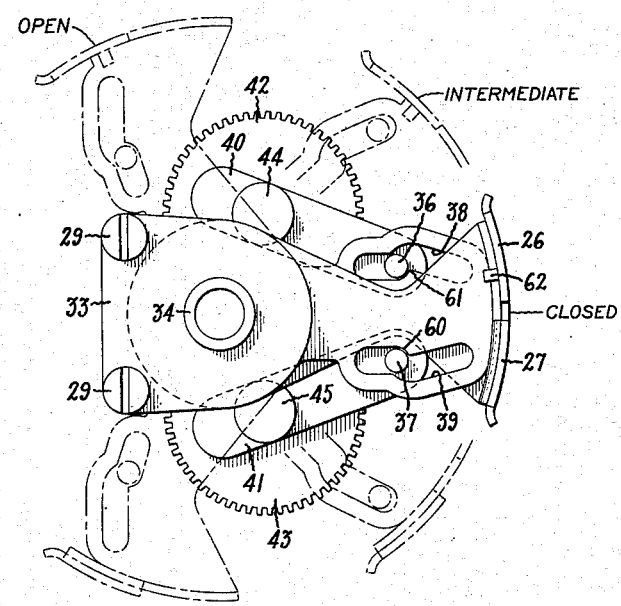
Inventor:
Samuel Gabrielson,
by Harry E. Dunham
His Attorney.

Patented Jan. 9, 1945

2,366,721

UNITED STATES PATENT OFFICE 2,366,721

GYRO CAGING DEVICE

Samuel Gabrielson, South Lynnfield, Mass., assignor to General Electric Company, a corporation of New York Application December 27, 1943, Serial No. 515,843

5 Claims. (Cl. 74—5)

My invention relates to improvements in caging devices for gyro instruments. Gyros are used on movable objects, such as airplanes, as basic positioning or reference orienting devices. Occasionally it is desirable to bring an axis or axes of the gyro in alignment with an axis or axes of the airplane, and this is called caging the gyro. This may be desirable previous to violent airplane maneuvers to protect the gyro, or it may be desirable from time to time due to drift of the gyro from correct position. The caging device described is suitable for caging a gyro with respect to two axes at right angles to each other, and is described as applied to an artificial horizon gyro used on airplanes. Among the objects of my invention is to provide a caging device which may be easily attached to or removed from a gyro, to provide a caging device which is not likely to be jarred from a caging position by vibration, and to provide a caging device which when moved to caging position does so gradually without shock on the bearings of the gyro.

Figure 1:
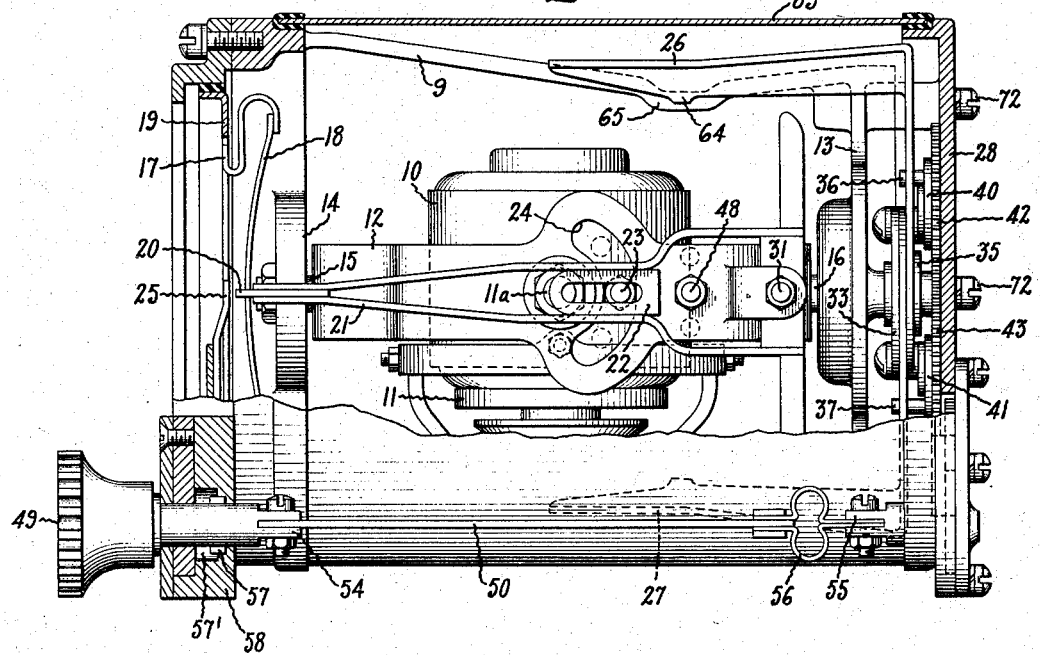
Figure 2:
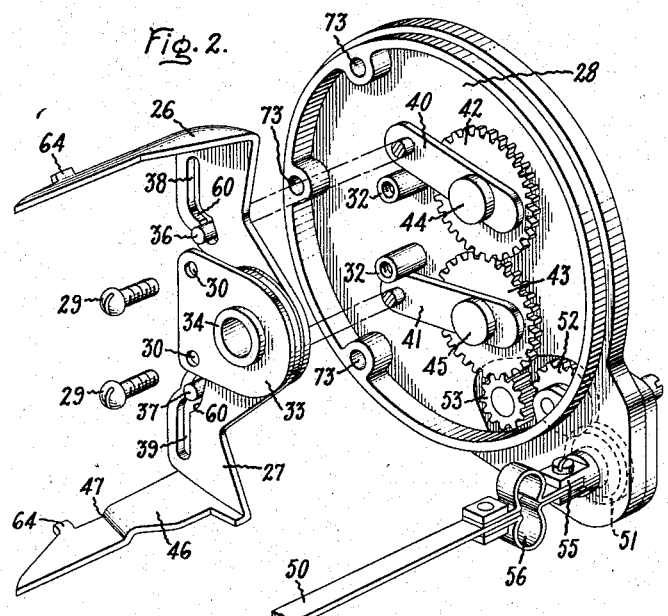
Figure 2:
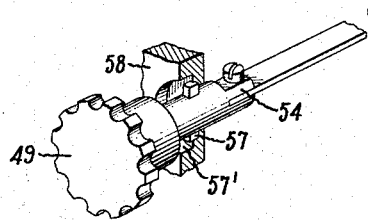

The features of my invention which are believed to be novel and patentable will be pointed out in the claims appended hereto. For a better understanding of my invention reference is made in the following description to the accompanying drawings in which Fig. 1 represents a side view partially in section of an artificial horizon gyro enclosed in a cylindrical casing and to which my caging device has been applied; Fig. 2 represents a somewhat exploded view of a caging head embodying my invention; Fig. 3 represents some of the principal parts of my caging device in caging position with respect to the caging pins of an artificial horizon gyro; and Fig. 4 indicates the main operating portions of the caging device in different operating positions.

In Fig. 1, I have represented sufficient of the construction of an artificial horizon gyro to illustrate how my caging device is applied thereto. Ten (10) may represent the stator bearing frame and 11 a portion of the rotor of gyro, the spin axis of which is normally vertical as represented in Fig. 1. The stator 10 is pivoted on a horizontal transverse axis 11a perpendicular to the plane of the drawings in a gimbal ring 12, and such gimbal ring is pivoted on a fore-and-aft major horizontal axis at right angles to the first in a suitable framework support 9 having front and rear bearing plates 13 and 14. The bearings or trunnions for gimbal ring 12 are at 15 and 16. Supporting plate 13 is called the front plate because the right-hand end of the instrument as pictured in Fig. 1 extends toward the front of the airplane on which it is mounted. The instrument is provided with certain indicators which the pilot observes as required by looking at the back face of the instrument. One of such indicators is a pointer 17 secured to a circular mask 18 which in turn is secured at its center to a shaft which extends through the bearing at 15 from gimbal ring 12. As gimbal ring 12 rotates relative to the casing about its axis through bearings 15 and 16, mask 18 and pointer 17 also rotate relative to the casing structure and the pointer 17 indicates relative to a scale at 19 the angle of bank of the airplane. Another indicator is a horizontal bar at 20 which extends horizontally in front of mask 18 from a skeleton lever 21 which is pivoted to gimbal ring 12 on a normally horizontal axis at 31. The horizontal bar 20 thus rotates from an apparently horizontal position with rotation of the gimbal ring 12 on its axis relative to frame 9. Between pivot 31 and the horizontal bar 20, lever 21 has a slotted guide 22 into which a pin 23 extends from the gyro stator 10. Pin 23 is displaced to the right of the axis 11 of the gyro stator and thus acts as a crank. Gimbal ring 12 has an arc-shaped opening 24 through which the pin 23 extends.

Hence, a tilting movement of the gyro stator 10 about axis 11 moves lever 21 up or down about its pivot 31, thereby moving the horizontal bar 20 up or down relative to the center of mask 18. The spin axis of the gyro ordinarily maintains a true vertical position, and the casing tips about the two axes with bank and pitch of the airplane so that the horizontal bar 20 changes position in the dial opening, moving up when the ship is climbing and tilting with respect to a horizontal index 25 when the airplane banks. The pilot by observing these indications thus obtains a true indication of the orientation of his plane relative to the horizon, and the instrument is thus called an artificial horizon gyro. The details of such an instrument are not features of the present invention, but the brief explanation of the general structure and operation of such an instrument is helpful to an understanding of the caging device now to be described.

When the airplane is in level flight, neither climbing nor diving nor in a bank, and the gyro is properly oriented in true position, the positions of the indicator parts are as represented in Fig. 1. This may be called the central position of the parts. One purpose of the caging device is to bring the gyro spin axis to a true vertical position if it is not in such position when the ship is in level flight. Another purpose of the caging device is to lock the gyro in fixed relation to the instrument framework during violent airplane maneuvers in order to prevent damage to the instrument.

The caging device employed is pictured separately in Fig. 2 and is shown mounted in place on the instrument in Fig. 1. These illustrations represent the caging device in open or noncaging position, and in Fig. 2 the caging jaw members 26 and 27 and their hollow bearing supporting structure are shown moved away from the head or supporting plate 28 for better illustration. When properly assembled the screws 29 enter holes 30 and screw into threaded bushings 32, rigidly holding bearing plate 33 against bushings 32. The bearing for jaw arms 26 and 27 comprises a hollow bushing 34 firmly staked in plate 33 and with an extended head supporting the forward face of arm 26 as shown in Fig. 1 at 35. The axis of rotation of such jaw arms coincides with the axis of rotation of the gimbal ring 12.

The jaws 26 and 27 are rotated about the bearing at 34 by means of crank pins 36 and 37 which enter generally radial, but somewhat crooked, slots 38 and 39 in the radially extending portions of the jaw members 26 and 27. Pins 36 and 37 extend from crank arms 40 and 41 fixed to the sides of gear wheels 42 and 43 rotatively mounted on bearing studs 44 and 45 staked into the head plate 28. The peripheries of gears 42 and 43 mesh with each other and are of the same size so that when gear 43 is turned counterclockwise as viewed in Fig. 2, the gears rotate in opposite directions and move their crank arms towards caging position at the same rate. Jaw member 26 moves clockwise and jaw member 27 moves counterclockwise at the same rate toward closed or caging position. The closed position is shown in Fig. 3 and in full lines in Fig. 4. The axes of rotation of the crank arms 40 and 41 are so positioned relative to the axis of rotation of the jaw members 26 and 27 that the jaw members rotate about 100 degrees and the gears 42 and 43 rotate about 180 degrees in moving from open to closed positions. In Fig. 4 open, intermediate, and closed positions of the jaw members are represented, the corresponding positions of jaw member 26 being so marked. It is seen that in this movement of the jaws from open to closed positions, the pins 36 and 37 first move outwardly and then inwardly in their slots 38 and 39, the pins being near the outer ends of the slots in the central intermediate positions.

In order to prevent interference between the two jaw members when approaching near to the closed positions, the portion 46 of jaw member 27 has a reduced radius as compared to jaw member 26 as best shown in Fig. 3. Such reduced radius portion 46 of jaw member 27 extends only to an offset at 47, so that the jaw proper beyond such offset is in line with the jaw proper of member 26 so that in closed or caging positions, such aligned jaws can squarely engage caging pins 23 and 48, to be described, between them.

The movement of gears 42 and 43 is accomplished by rotating a knob 49 (see Figs. 1 and 2) which is in easy reach of the pilot near the face of the instrument. Knob 49 is on the rear end of a shaft 50 which extends forward and is geared through gears 51, 52, and 53 to gear 43. These gears are rotatively secured in proper position in the caging head 28. In order that the caging head and mechanism may be readily removed from the instrument, shaft 50 may be disconnected at points 54 or 55 or both by means of the screw fastenings shown in Fig. 2. The shaft also includes a double bow spring resilient section at 56 which is so biased as to tend to shorten the shaft and which serves normally to hold a lock pin 57 into a locking slot at 57' in the casing structure part 58. When the pilot desires to rotate shaft 50 to uncage or cage the gyro when the pin 57 is in its slot 57', he first pulls the knob 49 toward him or to the rear to disengage pin 57 from its locking slot and then rotates the shaft. If the knob is released when pin 57 is in alignment with its slot, spring 56 draws the shaft forward to relock the shaft from rotation. The important locking position of shaft 50 is at the caged position of the jaw members. The gear ratio may be such that movement of the caging device over its complete range requires less than one revolution of the gear 51. In the full open or uncaged position of the jaw members, tabs 64 on the back side of the jaw portions engage in wedging relation with back stop surfaces 65 (see Fig. 1) on the instrument framework and serve to secure the jaws in open position. In the caged position the jaws are against the caging pins 23 and 48 which also serve as stops. It will be noted that the structure of shaft 50 and spring 56 is such as to allow a slight torsional resiliency of the shaft structure between gear 51 and lock 57. I preferably arrange matters so that in turning the shaft 50 to caging position, it is necessary to twist the shaft 50 very slightly an additional amount in the same direction to engage the lock pin 57 in its slot 57' after the jaws have come to their stopped positions. The same expedient may be used in the open position. By reason of this feature there is a slight torsional strain on shaft 50 when locked, urging the jaws to closed position, which is desirable. It takes up any backlash in the gears and prevents rattling. Also it helps to prevent unintentional unlocking of the shaft 50 due to vibration, etc.

It will further be noted that when in the caged position where shaft 50 may be locked, the pins 36 and 37 have moved inwardly in their slots 38 and 39 just beyond a jog 60 in such slots. The shape of this jog in relation to the direction of movement of the pins therein is made such as to tend to lock the jaws in a closed position unless released by movement of the crank arms. That is, attempt to move the jaws apart by pulling on the arms rather than by movement of the crank pins is resisted because the pins are substantially in line with the pivot points of their crank arms and the point of contact between the pins and the engaging shoulder of the slot. Thus in Fig. 4, pin 36 is substantially in line with the axis of rotation of gear 42 and the shoulder point of contact at 61, and any attempt to move pin 36 by movement of jaw member 26 upward produces a force on the crank comprising arm 40 and pin 36 in a dead-center direction towards the axis of rotation of gear 42. Hence this feature is important and desirable in preventing an unintentional uncaging movement of the parts due to vibration. However, an uncaging operation by application of the movement force through the crank arm rather than through the jaw member encounters no opposition of this nature.

When the jaws approach caging position, a pin 62 on jaw member 26 (see Fig. 3) engages a sloping surface 63 on the part 46 of jaw member 27 and prevents any tendency for the jaw parts to spread apart axially and produces a guiding, bracing action between the jaw members at this point, which is desirable from the standpoint of rigidity and good alignment of parts and in relieving the bearings of the jaw members from lateral strain.

The caging pin 48 extends outwardly from the side of gimbal ring 12, as shown in Fig. 1, into the path of movement of jaws 26 and 27. Such pin is perpendicular to the axis of rotation of such gimbal and may rotate about such axis in a plane perpendicular to such axis within an arc limited by the open position of the caging jaws. When the caging jaws are closed, the pin 48 and hence gimbal ring 12 are brought to the central position represented in Fig. 1. The caging pin 23 which serves also to move the horizontal bar lever 21 up and down has a path of movement about axis 11 with movement of the gyro casing 10 about such axis between the limits defined by the length of the arc-shaped slot 24 in gimbal ring 12. Of course pin 23 also rotates about the axis of rotation of the gimbal ring with such ring and may thus have a variety of positions relative to the casing of the instrument. It also extends into the path of movement of the caging jaws, and when they are closed will be brought to the central position represented at the same time the gimbal ring is centered. Thus the gyro is caged or its two axes of movement relative to the casing are brought to the central position shown in Fig. 1, whenever desired and for any reason. Fig. 3 represents a somewhat distorted exploded view of the caging features in caged position. In this view the inside of the gimbal ring 12 is towards the observer.

It will be apparent that during a caging operation the caging jaws are necessarily brought into contact with the caging pins and the pins forced to caging position rather gradually because due to the nature of the driving transmission, the caging jaws cannot be moved abruptly nor can an undesirable, excessive amount of force be applied through the thumb piece 49 by turning with the thumb and fingers. This is desirable to prevent damage to the bearings of the gyroscope because an abrupt displacement of the axis of a spinning gyro can produce an enormous strain on the bearings.

The caging head 28 which carries all of the caging parts except those associated with the left end of shaft 50 in Fig. 1 is secured to the forward end of the instrument framework part 13 by three screws, two of which are shown at 72, Fig. 1. Such screws enter through the holes 73 shown in Fig. 2. The caging head may be mounted in place either with or without the cylindrical shell enclosure part 83 (see Fig. 1). When assembled with the cylindrical shell, the rim of the casing head engages the end of the shell to provide a tight fit. The shell may be left off for test purposes. Thus it is seen that the caging device may be quickly removed or added to the gyro without disturbance of other essential parts. It will be evident from Figs. 1 and 2 that the gear 51 is housed in a portion of head 28 which extends beyond the edge of the circular cover part thereof so that the shaft 50 is outside of the casing 83 and hence is accessible for coupling and uncoupling.

What I claim as new and desire to secure by Letters Patent of the United States is:

1. In a gyro instrument, a supporting framework, a gimbal ring trunnioned in said framework on a fore-and-aft axis, a gyro rotor bearing frame pivoted in said gimbal ring on a transverse axis, said gimbal ring and rotor bearing frame having caging pins extending therefrom beyond the path of rotation of the gimbal ring perpendicular to the fore-and-aft axis, and means for engaging said caging pins and moving them to central positions to cage said gyro comprising a pair of caging members pivoted for rotation about the fore-and-aft axis outside of said gimbal ring, said members having radial arm parts and jaw parts extending in the direction of said instrument parallel to said fore-and-aft axis outside of said gimbal ring, said caging members having closed positions in which their jaw parts grasp said caging pins between them with the caging pins in their central positions and having open positions which allow for normal freedom of movement of such caging pins from their central positions, operating means for simultaneously moving both caging members from open to closed positions and vice versa and a supporting structure for said caging members and operating means removably secured to said framework and removable therefrom without disturbing any of the operating parts of said instrument.

2. In an artificial horizon instrument for airplanes, a gyro, a gimbal ring mounting therefor having its major axis trunnions fore and aft of the airplane and minor axis trunnions lateral, and means for caging said gyro in a central position corresponding to its normal position when the airplane is in straight level flight comprising a pair of caging members having radial arm parts pivoted for rotation about the major axis of said gyro outside of the gimbal ring and having jaw parts extending parallel to said axis outside the gimbal ring to approximately the minor axis, a caging pin extending from said gimbal into the path of rotation of said jaws, and a crank arm from the minor axis gyro part having its crank pin extending through an arc-shaped slot in said gimbal into the path of rotation of said jaws, both of said pins being engaged between said jaws with the gyro in the aforesaid central position when the jaws are rotated to caging position, a cage head for rotatively supporting said caging members, means carried by said cage head for simultaneously moving said caging members between open and closed positions and vice versa, said cage head and the parts supported and carried thereby being removable from said instrument as a unit without disturbing any of the operating parts of said instrument.

3. A caging head unit for removable mounting with respect to an artificial horizon gyro instrument comprising a supporting structure forming a circular front cover for such an instrument, a pair of arms pivotally mounted on the inside center axis of said structure, said arms having radial slotted parts and outer caging jaw parts extending axially away from said structure, said arms being rotatable in opposite directions from a position where the jaws are substantially closed through angles of the order of 90 degrees to an open position, a pair of similar sized intermeshed gears pivoted to said structure, crank arms secured to said gears with crank pins engaging the slots in the radial parts of said arms and arranged to move said arms between open and closed positions when said gears are rotated, said structure having a part extending beyond the edge of the front cover circle thereof, a shaft having a bearing in said extended part and extending out of the rear face thereof and gearing between said shaft and one of said intermeshed gears.

4. In a caging mechanism for gyro instruments, a supporting structure having a pair of caging arms pivoted thereto about the same axis, said arms containing radially extending slots having jogs therein, a pair of similar sized intermeshed gears rotatively mounted on said supporting structure on axes parallel to and equally distant from the axis of rotation of said caging arms, equal length crank arms secured to said gears having crank pins extending into the slots of said caging arms, means for simultaneously rotating said gears to cause the caging arms to rotate between open and closed positions, the arrangement being such that in moving said arms from open to closed positions the crank pins first move outwardly and then inwardly in said slots and such that in the closed positions of said caging arms the crank pins have thus moved inwardly just beyond the jogs in said slots, the jog in said slots being so shaped that shouldered surfaces of such slots rest against the crank pins at points subtantially in line with the crank pins and the axis of rotation of their crank arms when the caging arms are in the closed position, whereby movement of said caging arms from such position except through driving action of the crank pins is resisted.

5. In combination with a gyro instrument having a supporting framework with a gimbal ring trunnioned for rotation within said framework along a given axis and with bearings for said gimbal ring supported by said framework at opposite ends thereof, caging means for said instrument including a caging head rigidly but removably secured to one end of said framework and supporting caging mechanism in operative relation to said instrument and a caging turn knob extending from the other end of said framework, said knob being removably connected in operating relation with said mechanism through a shaft extending parallel with the axis of rotation of said gimbal ring and outside the range of rotation thereof, said shaft having a transversely extending locking pin adapted to fit into a locking slot in the knob end of the framework and to be released from said slot to enable the shaft to be turned by pulling on the knob, said shaft having a torque transmitting flexible section between the two ends of the framework which tends to shorten the shaft and thereby to pull the locking pin into its locking slot when the rotative position of the shaft permits, said section permitting the knob end of said shaft to be pulled endwise to unlock the same.

SAMUEL GABRIELSON.